United States Patent [19]

Kura

[11] 4,009,676

[45] Mar. 1, 1977

[54] MOUNTING ARRANGEMENT FOR PROTECTING SHIPBOARD NUCLEAR REACTORS AGAINST COLLISION DAMAGE

[75] Inventor: Herbert Kura, Bremen, Germany

[73] Assignee: Aktiengesellschaft "Weser", Bremen, Germany

[22] Filed: Mar. 14, 1975

[21] Appl. No.: 558,718

[30] Foreign Application Priority Data

Mar. 27, 1974 Germany .......................... 2414714

[52] U.S. Cl. .................. 114/78; 114/270; 114/75; 176/DIG. 3

[51] Int. Cl.² ..................... B63B 3/56; B63B 25/24

[58] Field of Search .................. 114/72, 68, 75, 69, 114/76, 73, 78, .5 R; 220/15, 3; 176/87, DIG. 3

[56] References Cited

UNITED STATES PATENTS

| 1,307,983 | 6/1919 | Lynn | 114/72 |
|---|---|---|---|
| 1,310,233 | 7/1919 | Armstrong | 114/78 |
| 3,659,541 | 5/1972 | Rigg | 114/.5 R |

FOREIGN PATENTS OR APPLICATIONS

| 1,155,686 | 10/1963 | Germany | 176/DIG. 3 |
|---|---|---|---|
| 1,916,161 | 10/1969 | Germany | 114/78 |
| 1,942,271 | 5/1970 | Germany | 114/78 |
| 121,164 | 12/1918 | United Kingdom | 114/78 |

*Primary Examiner*—Trygve M. Blix
*Assistant Examiner*—Stuart M. Goldstein
*Attorney, Agent, or Firm*—Michael J. Striker

[57] ABSTRACT

A mounting arrangement for protecting shipboard nuclear reactors against collision damage comprises a polygonally-shaped shield which has a plurality of wall portions surrounding the lateral sides of a reactor which is located in the interior of a ship's hull. The shield has two opposite converging pairs of wall portions which are fixedly anchored to the hull, and each of the pairs forms an angle whose bisectrix is normal to a line which extends lengthwise of the hull.

12 Claims, 7 Drawing Figures

Fig. 3

MOUNTING ARRANGEMENT FOR PROTECTING SHIPBOARD NUCLEAR REACTORS AGAINST COLLISION DAMAGE

BACKGROUND OF THE INVENTION

The present invention relates to a mounting arrangement for protecting nuclear reactors aboard ships, and more particularly for protecting the nuclear reactors from the effects of a collision.

It has been proposed in the prior art to protect nuclear reactors on board ship against damage due to collision with other ships, foreign objects in the sea, or such stationary structures as piers, by providing the rammed ship with resilient material which is intended to absorb the force of collision as a function of its resilience characteristics.

Experimental and statistical tests have been conducted of the largest anticipated collision force and the expected range of amplitudes of collision ramming forces and their associated direction or ramming angles which are to be anticipated in a typical sea collision situation. A report summarizing the test results is published in the German publication "Hansa", Volume 12, 1964, pages 1-11. In the most frequent collision situation, a ramming ship will engage a rammed ship broadside, i.e., more or less substantially normal to the line or axis which extends lengthwise of the hull.

The prior art has attempted to deal with this aforementioned ramming situation by reinforcing the outer hull plating with heavy steel plates and by providing a plurality of protective decks having walls which extend longitudinally of the axis of the ship, i.e., longitudinal bulkheads, and walls which extend tranversely to the axis of the ship, i.e., cross-bulkheads.

The many decks are constructed of heavy metal material and the spaces between them are generally filled with resilient materials so as to aid in absorbing the collision forces. The prior art suffers from the disadvantage that the construction of building a plurality of steel decks is not only expensive and complex, but it contributes to a very heavy deadweight for the ship. Thus, the prior art has been found to be unsatisfactory for shielding nuclear reactors which are located in the interior of the ship's hull.

SUMMARY OF THE INVENTION

Accordingly, it is the general object of the present invention to overcome the disadvantages of the prior art.

More particularly, it is an object of the present invention to protect and shield a nuclear reactor located within the interior of the hull of a ship from the effected collision forces.

Another object of the present invention is to shield the reactor in the most effective manner so that it is able to withstand broadside collision forces which act more or less substantially in the normal direction as considered with respect to the axis of a ship.

An additional object of the present invention is to divert from the collision force so that it is transmitted away from the point of collision and distributed throughout the hull of the ship.

In keeping with these objects and with others which will become apparent hereinafter, one feature of the present invention is to provide a rigid polygonally-shaped shield which has a plurality of planar wall portions which surround the lateral sides of a reactor to be protected. The shield has two opposite converging pairs of wall portions which are fixedly anchored to the hull of the ship. Each wall portion pair forms an angle whose bisectrix is substantially normal to a line or axis which extends along the length of the hull.

Preferably, the shield will have four wall portions and take on a quadrilateral configuration. In the quadrilateral embodiment, the reactor is positioned inside the shield so that the vertical axis of the reactor lies at the intersection of the axis of the ship with the bisectrix.

The ship's hull is comprised of an outer hull portion and longitudinal bulkheads which are located on opposite sides of the axial line of the ship and which are inwardly spaced of the outer hull portion. Cross-bulkheads which are transverse or perpendicular to the longitudinal bulkheads are also comprised in the ship's hull. Thus, the shield may be secured to the hull at either of these locations.

Specifically, if the shield has a quadrilateral shape and if the two opposite pairs of wall portions are respectively secured to the cross-bulkheads and the longitudinal bulkheads then the shield will take a rectangular or square shape depending upon the spacing of the bulkheads relative to each other. Alternately, if the two opposite pair of wall portions are respectively secured to the outer hull and the cross-bulkheads, then the shield will take on a parallelogram or rhombus-like shape, again depending upon the spacing of the bulkheads and the outer hull relative to each other.

This mounting arrangement simply and effectively overcomes the aforementioned prior art disadvantages associated with using resilient material and requiring a plurality of decks. The nuclear reactor which is provided within the shield is kept free from the effects of a collision inasmuch as the force is distributed by the shield throughout the hull of the ship and not allowed to act only at the area or point of collision. The rigidity and the orientation of the shield permit the shield to withstand all anticipated collision forces without substantially elastically or plastically deforming.

Another feature of the present invention is that the shield may further comprise additional wall portions to enclose the upper and lower sides of the reactor, thereby completely enclosing the latter. The lower side is protected by a reinforced planar platform which has support legs embedded therein. For example, the platform may be formed of any crush-resistant material, such as concrete and may be reinforced by metal rods or the like. The legs support the reactor and effectively aid in isolating all collision forces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
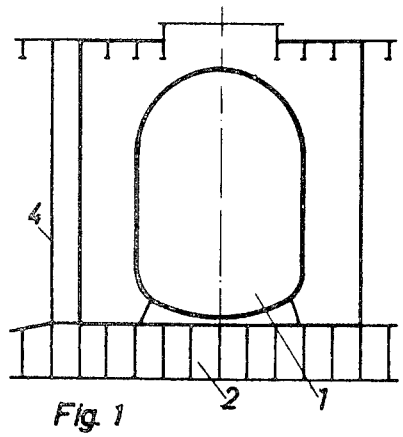
FIG. 1 is a longitudinal view as seen from lines I—I of FIG. 3.
Figure 2:
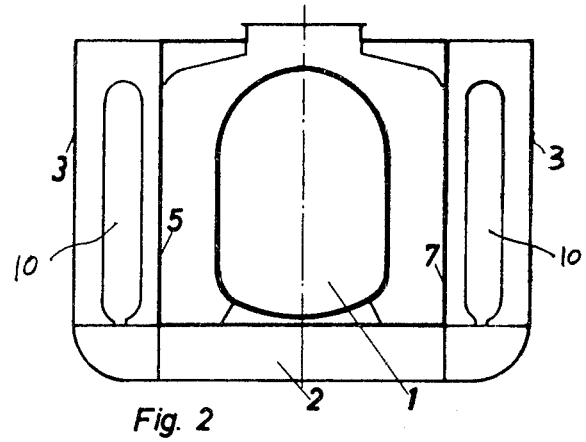
FIG. 2 is a transverse view as seen from line II—II of FIG. 3.

Discussing the mounting arrangement which has been illustrated in a first exemplary embodiment in FIGS. 1 to 5, reference numeral 1 identifies a shipboard nuclear reactor (although it should be understood that the invention is also applicable to any other type of shipboard equipment which is desired to be protected from collision forces resulting when the ship is rammed). The ramming forces can result from accidental collision with other ships, foreign objects in the sea or such stationary structure such as piers. The reactor 1 is mounted on a support structure, such as the support legs which are mounted on or embedded in a reinforced crush-resistant platform, such as concrete, or the double-bottomed portion 2 of the ship's hull. The double-bottomed portion 2 serves also to protect the underside of the reactor 1 from the effects of the collision force.

The hull of the ship extends in a generally lengthwise or axial direction. The hull has an outer hull portion or skin 3 and longitudinal bulkheads or walls 5 located parallel to the axial line of the hull. Cross-bulkheads or wall 4 extend in a direction substantially perpendicular to the axial line of the hull.

The mounting arrangement for protecting the nuclear reactor 1 includes a polygonally-shaped shield 7 which has a plurality of wall portions which surround the lateral sides of a reactor to be protected. The wall portions are preferably planar; two opposite converging pairs of the wall portions are fixedly anchored to the hull.

In one mounting arrangement, the opposite pairs of wall portions are fixedly secured to the outer hull 3. The opposite ends of the pairs of wall portions meet along the axial line of the hull and are fixedly secured to a pair of cross-bulkheads 4 axially spaced along the axial line of the hull and on opposite sides of the reactor 1 to be protected. In this case, if the polygonally-shaped shield 7 has four wall portions, then the shield 7, which assumes a quadrilateral shape, takes on a parallogram- or rhombus-like configuration depending upon the spacing of the cross-bulkheads 4 relative to the outer hull 3. This mounting arrangement is shown by the dashed lines of FIG. 3.

In a secondary optional mounting arrangement, the opposite pairs of wall portions are fixedly connected to longitudinally bulkheads 5 which are located on opposite sides of the axial line and which are spaced inwardly of the outer hull 3. The opposite respective ends of the two pairs of wall portions meet along the axial line of the ship's hull and are fixedly secured to the cross-bulkheads 4. In this option, if the shield 7 has four wall portions, then the shield 7 will take on a rectangular or square-shaped configuration depending upon the relative spacing of the bulkheads 4 and 5 with respect to each other. This option is shown by the solid lines of FIG. 3.

In both cases, the pairs of opposite converging wall portions of the shield 7 meet to form an angle whose bisectrix H is substantially normal to the axial line of the hull, i.e, normal to the direction in which the ship travels on the high seas. The reactor 1 is positioned inside the shield 7 so that the vertical axis of the reactor lies at the intersection of the axial line of the hull and the bisectrix H. This particular orientation is effective in preventing collision forces from damaging the reactor in the most typical and most frequent broadside ramming situation, as noted above.

The shield 7 is constructed of rigid material, such as steel, and extends from the top deck of the ship to the bottom-deck portion 2. As more clearly shown in FIG. 3, the quadrilateral-shaped shield 7 is oriented at 45° with respect to the axial line of the ship. This rigid construction makes it able to withstand any anticipated collision force wihout deformation. In this way, the ramming energy of a ramming ship or other object is warded off and substantially nullified.

Profile forms or stiffening members 6 are located intermediate the outer hull 3 and the longitudinal bulkheads 5 to facilitate the absorption and the distribution of the collision forces throughout the hull.

The hollow regions 10 are spaces to accommodate the stiffening members 6. Stringers and/or transverse webs may be further located in the region 10 for reinforcing the outer hull portion 3 as is well known in the art.

The shield 7 further comprises additional wall portions which enclose the upper and lower sides of the reactor 1, so that a container or complete cover is formed.

Figure 3:
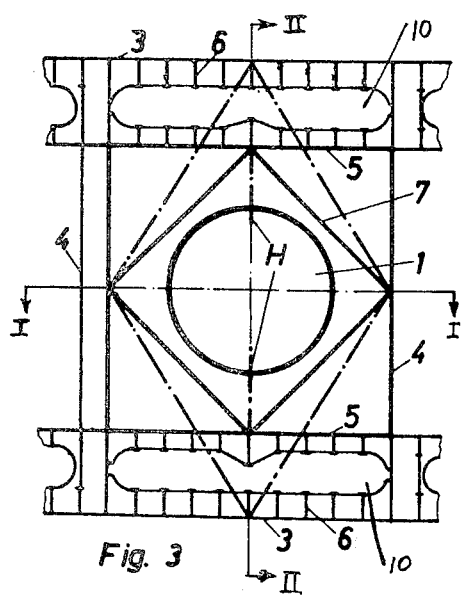
FIG. 3 is a top view of the apparatus according to the invention.
Figure 4:
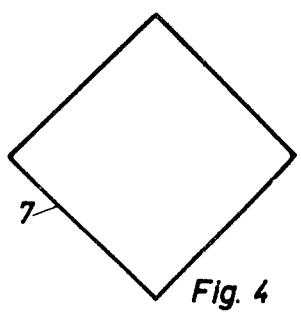
FIG. 4 is a top view of the shield as shown in FIG. 3 removed for clarity.
Figure 5:
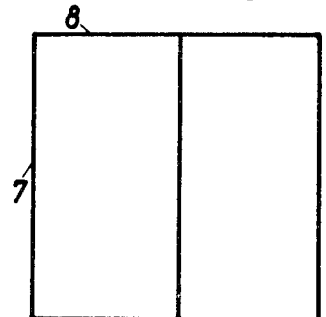
FIG. 5 is a side view of FIG. 4.

FIG. 4 shows the top view of the shield 7, as illustrated in FIG. 3, but removed for clarity. FIG. 5 shows a side view of FIG. 4. Reference numeral 8 indicates the top side of the shield 7 which is fixedly connected to the ship's top deck and reference numeral 9 indicates the bottom side of the shield 7 which is connected to the ship's bottom-hull portion 2. In this way, no collision force coming from above or below the reactor 1 can affect it, thereby resulting in virtually complete isolation.

Figure 6:
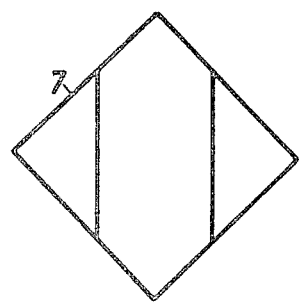
FIG. 6 is a top view of another embodiment of the shield according to the invention.
Figure 7:
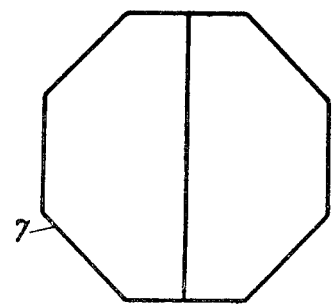
FIG. 7 is a side view of FIG. 6.

FIGS. 6 and 7 show the top and side views respectively of an octogonally-shaped shield 7. The illustrated sloped corner regions of the shield 7 may be provided with steel plating so as to assure a rigid shield.

From the foregoing, it is evident that the shield 7 diverts the ramming energy of a ramming object away from the reactor. In effect, the shield distributes the shock force from the point of collision throughout the hull of the ship to be protected.

It will be understood that each of the elements described above, or two or more together, may also find a useful application in other types of a mounting arrangement for protecting shipboard nuclear reactors from collision differing from the types described above.

While the invention has been illustrated and described as embodied in a mounting arrangement for protecting shipboard nuclear reactors from collision, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A mounting arrangement for protecting shipboard equipment from collision forces, comprising a ship having bulkheads which bound an interior space in which equipment to be protected is stored; and a discrete polygonally-shaped shield separate from said bulkheads and being mounted to said ship in said space so as to farm within said space a call which surrounds the equipment to be protected, said shield comprising a plurality of wall portions each having respective opposite ends fixedly anchored to said ship, said wall portions being arranged in two opposite pairs each including two wall portions inclined relative to each other so as to include with one another an angle whose bisectrix is normal to a line which extends along the length of said ship.

2. The combination as defined in claim 1, wherein said ship has an outer hull, and wherein said two opposite pairs of said wall portions are fixedly secured to said outer hull.

3. A combination as defined in claim 1, wherein said ship has an outer hull and longitudinal bulkheads located on opposite sides of said line and being spaced inwardly of said outer hull, and wherein said two opposite are fixedly anchored pairs of said wall portions to said longitudinal bulkheads.

4. A combination as defined in claim 1, wherein said shield has additional wall portions to enclose the upper and lower sides of the equipment, thereby forming a container.

5. A combination as defined in claim 3; and further comprising a plurality of stiffening members located intermediate said outer hull and said longitudinal bulkheads so as to facilitate the distribution of the collision forces throughout said ship.

6. A combination as defined in claim 1; and further comprising a reinforced base having support legs mounted therein and extending upwardly therefrom for supporting the equipment.

7. A combination as defined in claim 1, wherein said shield is octagonally-shaped.

8. A combination as defined in claim 1, wherein said shield is rigid and able to withstand anticipated collision forces without deformation and thereby protect said reactor from the effects of a sea collision.

9. A combination as defined in claim 1, wherein said ship has cross-bulkheads axially spaced along said line on opposite sides of equipment to be protected, said cross-bulkheads extending in a direction substantially normal to said line; and wherein the respective ends of said two opposite pairs of said wall portions meet along said line; and wherein said respective ends of said two opposite pairs are fixedly secured to said cross-bulkheads.

10. A combination as defined in claim 1, wherein said ship has longitudinal- and cross-bulkheads bounding said interior space; and wherein the respective opposite ends of said wall portions of said shield are only fixedly secured to said longitudinal- and cross-bulkheads respectively.

11. A combination as defined in claim 1, wherein said shield has four planar wall portions defining a quadrilateral configuration; and wherein the equipment is an elongated tank positioned inside said shield so that the axis of elongation of the tank lies at the intersection of said line of said ship with said bisectrix.

12. A combination as defined in claim 11, wherein said elongated tank is part of a nuclear reactor.

* * * * *